United States Patent [19]

Bill et al.

[11] 4,076,287

[45] Feb. 28, 1978

[54] PREPARED JOINT FOR A TUBE FITTING

[75] Inventors: Roland F. Bill, Washington; Edward G. Prohaska, Aurora; Bernard A. Wabel, Peoria, all of Ill.

[73] Assignee: Caterpillar Tractor Co., Peoria, Ill.

[21] Appl. No.: 739,880

[22] Filed: Nov. 8, 1976

Related U.S. Application Data

[63] Continuation of Ser. No. 573,648, May 1, 1975, abandoned.

[51] Int. Cl.$^2$ ............................................. F16L 13/04
[52] U.S. Cl. .................................... 285/382.4; 285/363
[58] Field of Search ................... 285/382.4, 382.5, 382, 285/382.1, 382.2, 256, 422, 258, 173, 259, 222, 363; 29/507, 523, DIG. 31; 75/.5 AA, .5 AB, .5 BA, .5 BB; 403/179, 404

[56] References Cited

U.S. PATENT DOCUMENTS

| | | | |
|---|---|---|---|
| 1,178,714 | 4/1916 | Griffin | 285/349 X |
| 2,942,334 | 6/1960 | Blue | 75/.5 BA |
| 3,367,683 | 2/1968 | Mattson | 285/259 X |
| 3,404,903 | 10/1968 | Frantz | 285/363 |
| 3,428,338 | 2/1969 | Corwin | 285/382.4 X |
| 3,967,840 | 7/1976 | McFall | 285/382.4 |

FOREIGN PATENT DOCUMENTS

| | | | |
|---|---|---|---|
| 680,620 | 1/1965 | Italy | 285/382.4 |
| 455,785 | 3/1950 | Italy | 285/382.4 |
| 1,121,851 | 7/1968 | United Kingdom | 285/382.4 |

Primary Examiner—Dave W. Arola
Attorney, Agent, or Firm—Frank L. Hart

[57] ABSTRACT

An improved prepared joint is provided on a fitting for mechanically joining it to the end of a metal tube. The fitting has a grooved bore and a bore extending end portion for projecting the bore a predetermined distance beyond its grooved portion so that during radial expansion of the tube into the grooved portion the entire expanded length of the tube is fully supported within the fitting. Such support is effective in extending the useful life of the tube assembly formed by the fitting and tube by alleviating metal fatigue failures due to vibrational bending stresses in the expanded portion of the tube.

18 Claims, 4 Drawing Figures

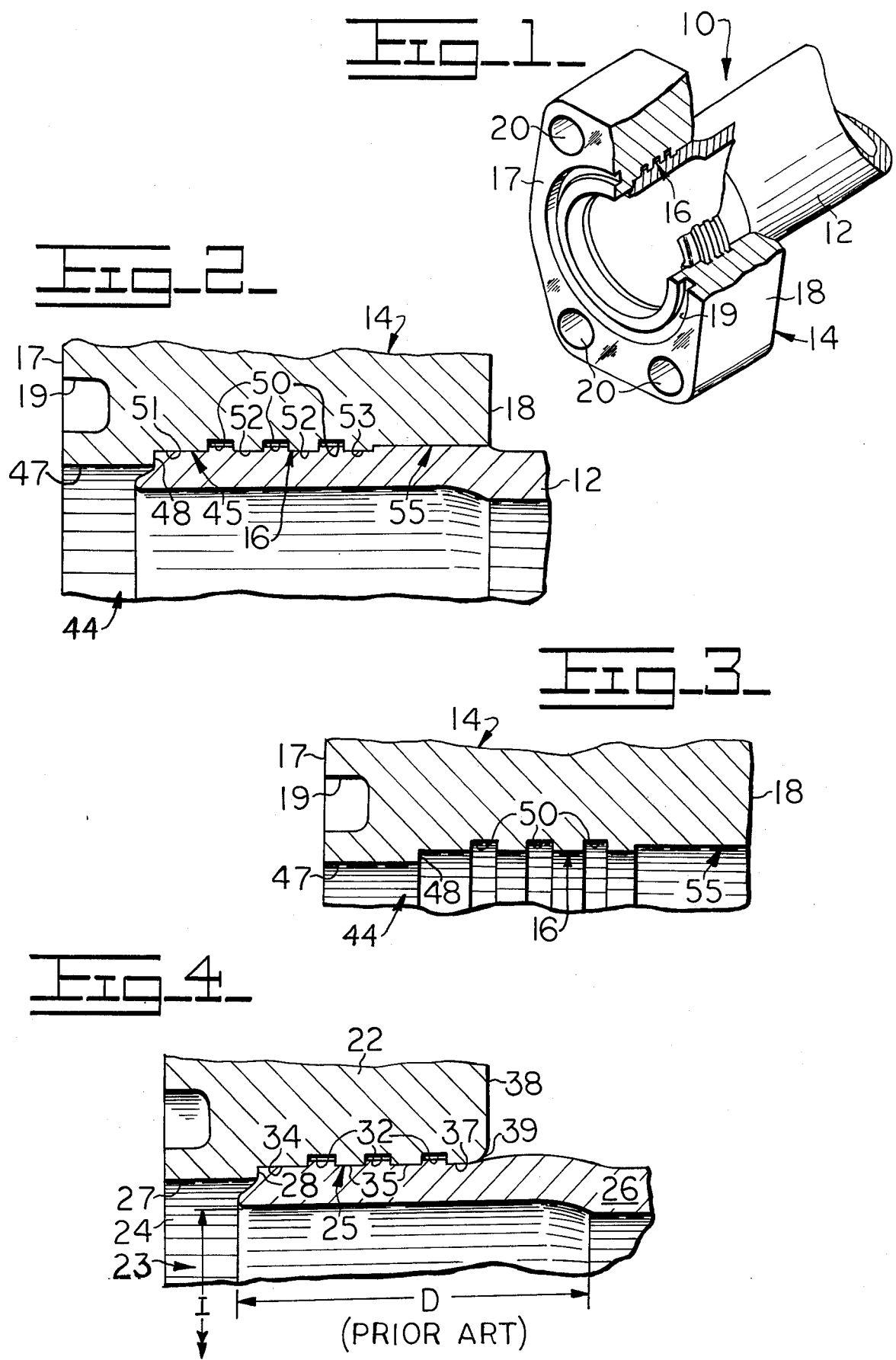

PREPARED JOINT FOR A TUBE FITTING

This is a continuation of application Ser. No. 573,648, filed May 1, 1975, now abandoned.

BACKGROUND OF THE INVENTION

Fittings are provided on the ends of metal tubes used as conduits in hydraulic systems and the like to facilitate the mounting of such tubes to various components of the system or to other tubes. While various methods are known for providing a fluid tight connection between a tube and a fitting, a method known as mechanical joining is widely used because of its ease and economy. Mechanical joining is the process of cold flowing metal of the tube into tight sealing engagement with that of the fitting by the use of a mechanical expanding tool.

In order for a tube to be properly mechanically joined to a fitting, the fitting must have a prepared joint which normally includes a grooved bore sized for freely admitting the end of the tube therein. Heretofore, the length of the bore has been only long as necessary to accommodate whatever number, normally three or four, of shallow annular, axially spaced locking grooves provided to prevent the separation of the tube and fitting.

The typical mechanical expanding tool includes a plurality of caged rollers which are circumferentially disposed about a tapered mandril. By inserting the tool within the end of the tube and by rotatably feeding the mandril through the rollers, such rollers are forced outwardly against the inside diameter of the tube which causes the radial expansion of the tube into tight sealing engagement with the bore of the fitting in which the tube is disposed. It will be appreciated that the tube is entirely uniform prior to being joined to the fitting.

To insure the information of a reliable joint, certain industrial standards have been developed which specify what the inside diameter of the tube should be after forming and to what depth the tube should be expanded from its end. As will be hereinafter more fully explained, such standards take into account manufacturing tolerances and safety margins which require the expansion of the tube past the end face of the prior art fittings. This expanded portion of the tube which extends past the end face has a thinner wall than that of the normal nonexpanded portion of the tube which, because of being unsupported by the fitting, makes it more susceptible to metal fatigue than any other portion of the tube. When these thinner unsupported tube portions are subjected to the higher vibrational bending stresses experienced in today's modern high pressure hydraulic systems, they frequently rupture, causing undue fluid losses. This problem is particularly severe in systems which are pressurized by piston type pumps because such pumps have a tendency to produce high speed pressure surges which frequently match one of the natural resonant frequencies of the tubes.

OBJECTS OF THE INVENTION

Accordingly, an object of this invention is to provide a fitting having an improved prepared joint for mechanically joining such fitting onto the end of a metal tube.

Another object of this invention is to provide a prepared joint which makes the tube more resistant to metal fatigue due to severe vibrational bending stresses so as to prevent the rupture of such tube during subsequent operation.

Another object of this invention is to provide an improved prepared joint which is effective in eliminating the thin, unsupported portion of the tube created in the mechanical joining process with prior art fittings so as to alleviate tube ruptures thereat.

Other objects and advantages of the present invention will become more readily apparent upon reference to the accompanying drawings and following description.

BRIEF DESCRIPTION OF THE DRAWINGS

FIG. 1 is a fragmentary isometric view of a tube assembly with portions broken away to illustrate an improved prepared joint embodying the principles of the present invention for a fitting to which a tube is mechanically joined.

FIG. 2 is an enlarged sectional view taken along the line II of FIG. 1 and showing the improved prepared joint in greater detail.

FIG. 3 is an enlarged cross sectional view of the portion of the fitting of FIG. 2 illustrating the improved prepared joint prior to the insertion of the tube thereinto.

FIG. 4 is a cross sectional view similar to FIG. 2, but illustrating a prepared joint of a prior art fitting and its mechanical connection with a tube.

DETAILED DESCRIPTION OF THE INVENTION

Referring more particularly to the drawings, a tube assembly is partially shown at 10 in FIG. 1 and generally includes a length of deformable metal tube 12 and a fitting, such as a mounting flange 14. As will be hereinafter described in more detail, the flange 14 is provided with an improved prepared joint 16 embodying the principles of the present invention for enabling the mounting of the flange on one end of the tube by a mechanical joining process hereinafter more fully described.

The tube assembly 10 is particularly applicable for use in a high pressure hydraulics system, not shown, for conducting hydraulic fluid whose pressure may exceed 4,000 psi. For use in such an environment, the tube is preferably constructed from a mild steel, such as SAE 1008, and is of a uniform size throughout prior to being connected to the flange 14. The outside diameters of tubes for such use typically range from ¾ to 3 inches with such tubes having a wall thickness ranging from 0.065 to 0.250 inches.

The flange 14 is preferably constructed of a metallic material, such as high carbon steel, having a hardness exceeding that of the steel tube. Preferably, the hardness of the flange should exceed that of the tube by approximately 20 points on the Rockwell B scale to prevent the deformation of the flange during the mechanical joining process. The flange may also be made of powdered metal or more particularly a powdered alloy iron which is formed in accordance with the teachings of application Ser. No. 558,198, filed Mar. 13, 1975, for "Improved Joint and Process for Forming Same," which application is assigned to the assignee hereof. As more fully described in such application, it has been found that when the flange portion of a mechanical joint connection is formed from powered metal, the resulting joint is significantly more torque resistant than similar joints made using identically shaped flanges which are formed from machined metal of substantially the same or even considerably higher measurable Rockwell B hardness than the powdered metal flange. Since powdered metal flanges are also less expensive than machined metal flanges, this provides a significant and important practical, as well as structural, advantage.

In general, the mounting flange 14 has a mounting face 17 for mounting against any suitable components, not shown, of the hydraulic system and an opposite exit face 18, so called because of the tube 12 exiting therefrom. The mounting face is shown with a seal groove 19 provided therein to accommodate any suitable seal, also not shown, for sealing purposes. The flange also includes a plurality of the bolt holes 20 therethrough to facilitate the mounting of the tube assembly to such component.

Heretofore, prior art fittings have been constructed in a manner similar to the one indicated by reference numeral 22 in FIG. 4 which includes a conventional prepared joint 23 made in accordance with standard industrial mechanical joining practices. Such joint includes a stepped bore 24 having a grooved portion 25 sized to freely accept the end of a tube 26.

A reduced diameter end portion 27 defining a shoulder 28 is provided in the bore to engage the end of the tube for positioning purposes. The grooved portion 25 of the bore 24 is provided with at least one and preferably a plurality of relatively shallow annular locking grooves 32. Such grooves are normally approximately 0.015 inches deep from the periphery of the bore and are spaced axially therealong so as to define a plurality of spaced lands on the opposite sides of such grooves including a front land 34 adjacent the shoulder 28, a pair of intermediate lands 35, and a rear land 37.

Those skilled in the art will appreciate that the widths of the lands and grooves are selected to provide sufficient material for shear strength to prevent the separation of the fitting and tube during subsequent operation. It will also be appreciated that the grooves and lands are diametrically sized with consideration being given to standard manufacturing tolerances to which the complementary parts, i.e., fitting 22 and tube 26, are made so as to facilitate ease of assembly and the formation of a sound connection by the standard industrial mechanical joining practices.

As previously described, such joining is accomplished by using any suitable mechanical expanding tool, not shown, to cause the expansion of the tube to a predetermined minimum inside diameter dimension "I" and to a predetermined minimum depth dimension "D" as prescribed by the standard mechanical joining practices. The resultant expansion of the tube to such minimum inside diameter dimension insures the cold flow of the tube metal into the locking grooves 32 to at least approximately one-half the depth of the grooves, as shown, under the most adverse tolerance stackup conditions. This provides a sufficient amount of interlocking between the tube and the fitting to prevent their separation during subsequent operation. It will be appreciated that under other tolerance conditions the grooves may be completely filled. Also, a greater amount of thinning of the tube wall thickness may occur.

The expansion of the tube to the minimum depth is effective in insuring that all of the grooves are filled equally. However, the length of the grooved portion 25 of the bore is only sufficient to accommodate the locking grooves 32, as previously mentioned, which causes the minimum expansion depth of the tube, as readily visible in FIG. 4, to extend substantially past the exit face 38 of the fitting. A radiused corner, indicated at 39, is normally provided about the exit end of the bore to prevent the formation of a severe stress riser in the tube thereat by the expanding process. However, this still leaves a portion of the expanded length of the tube beyond the exit face of the fitting which is unsupported by such fitting. It is in such unsupported portion that metal fatigue failure is most likely to occur.

The improved prepared joint 16 of the present invention, as illustrated in FIGS. 2 and 3, includes a stepped bore 44 having a grooved portion 45 for receiving the end of the tube 12 and a reduced diameter end portion 47 with a shoulder 48 which are constructed in a manner similar to those of the prior art prepared joint 23. The grooved portion 45 is also similarly provided with at least one and preferably a plurality of relatively shallow locking grooves 50 and lands 51, 52, and 53.

However, in contrast to such prior art prepared joint 23, the improved prepared joint 16 of the present invention is provided with an extended end portion 55 which projects the bore 44 past the maximum depth of the expansion of the tube so as to afford radial support for the entire expanded length of the tube. It will be recognized that this is preferably accomplished by simply increasing the thickness of the flange so that the end of the expansion falls inside of the exit face 18, instead of on the outside thereof, as in the prior art prepared joint.

The extended end portion 55 is also preferably provided with a predetermined diametral size which places it approximately midway between the diametral sizes of the grooves 50 and the lands 51 through 53, and thus is hereinafter referred to as a mid-land/groove exit because of its size and because it extends from the rear land 53 to the exit face 18 of the flange.

While other diametral sizes for the extended end portion have been found superior to the prior art prepared joints, the mid-land/groove exit 55 has shown unexpectedly superior results. In fact, in comparison tests subjecting various tube assemblies to severe vibrational bending stresses, the tube assemblies with the improved mid-land/groove exit had an average fatigue life approximately twelve times greater than tube assemblies with conventional prior art prepared joints.

While not intended to be bound by theory, the reason for the mid-land/groove superiority is believed to reside in the interrelational effect it provides between the manufacturing tolerances of the fitting and tube and current mechanical joining standards. Thus, within the maximum possible range of tolerance deviations, the mid-land/groove provides the best obtainable compromise between providing positive engaging support for the tube under maximum negative tolerance stackup conditions and the minimum amount of undesirable tube wall thinning under maximum positive tolerance stackup conditions.

Thus, as is readily apparent from the foregoing, the construction of the present improved prepared joint fully satisfies the objects of the present invention by increasing the useful life of tube assemblies by making the tubes employed therein more resistant to fatigue failures due to vibrational bending stresses. This is accomplished by providing an extended end portion on the prepared joint so that the entire length of the tube expanded by the mechanical joining process is supported within the fitting so as not to be as susceptible to such bending stresses.

While the present invention has been described with particular reference to the preferred embodiment thereof, it will be apparent that variations might be possible that would fall within the scope of the present invention, which is not intended to be limited except as defined in the following claims.

What is claimed is:

1. A tube assembly, comprising:
a flange having an axis, first, second, third, fourth and fifth portions as consecutively measured along the axis from a first end of the flange, an annular opening extending therethrough and defining inner walls, a plurality of annular grooves, at least one annular land, and an annular rear land, said opening of said first portion being of a first preselected diameter, said opening of said second portion being of a second preselected diameter, said opening of said third portion being defined by annular grooves of a third preselected diameter spaced one from the other by said annular land which has a fourth preselected diameter, said annular rear land having a fifth preselected diameter, said opening of said fifth portion being of a sixth preselected diameter, said second, fourth and fifth preselected diameters being of a substantially uniform, common value, said sixth preselected diameter being of a substantially uniform value greater than said second, fourth, and fifth preselected diameters, and said third preselected diameters being of a substantially uniform, common value greater than said sixth preselected diameter;
a metal tube having first, second, third, fourth, fifth and sixth portions as consecutively measured from the first portion of the flange along the axis, said first, second, third, fourth and fifth tube portions extending into the flange opening, said first portion of the tube having an edge portion adjacent the first portion of the flange, said second and fifth portions of the tube being in forcible contact with inner walls of the respective second and fifth portions of the flange, portions of said third portion of the tube adjacent the annular land being in forcible contact with said annular land, portions of said third portion of the tube adjacent the annular grooves extending into said annular grooves, said fourth portion of the tube being in forcible contact with the annular rear land, and said sixth portion of the tube extending outwardly from the flange.

2. A tube assembly, as set forth in claim 1, wherein the diameter of the annular grooves is greater than the outside diameters of the portions of the tube extending into said grooves.

3. A tube assembly, as set forth in claim 2, wherein the portions of the tube extending into the annular grooves extend into the grooves a distance of at least one-half the depth of said grooves.

4. A tube assembly, as set forth in claim 1, wherein the first end of the flange has a groove extending substantially concentrically about the opening of the flange.

5. A tube assembly, as set forth in claim 1, wherein the first, second, third, and fourth portions of the tube have an enlarged inside diameter relative to the inside diameter of the sixth portion of the tube and portions of the fifth portion of the tube within the flange and adjacent the sixth portion of the tube have an inside diameter intermediate the inside diameter of other portions of said fifth portion of the tube and the inside diameter of said first, second, third and fourth portions of the tube.

6. A tube assembly, as set forth in claim 1, wherein the outside diameter of the sixth portion of the tube is less than the outside of the portions of the tube within the flange.

7. A tube assembly, as set forth in claim 1, wherein the opening of the first portion of the flange is of less diameter than the second opening diameter and forms a shoulder.

8. A tube assembly, as set forth in claim 7, wherein a portion of the end of the tube is abutting the flange shoulder.

9. A tube assembly, as set forth in claim 1, wherein the fifth portion of the flange has a length, as measured along the axis, greater than the total of the lengths of the annular grooves.

10. A tube assembly, as set forth in claim 1, wherein there are a plurality of annular lands each positioned between annular grooves.

11. A tube assembly, comprising:
a flange having an axis, a central opening extending along said axis, inner walls, a plurality of annular grooves extending about the inner walls, at least one annular land extending about the inner walls and separating the annular grooves one from the other, an annular rear land extending about the inner walls, an annular exit groove extending about the inner walls and having a predetermined length as measured along the axis and a uniform diametral dimension greater than the diametral dimension of said annular rear land; and
a metal tube positioned within the flange opening and being deformed outwardly into forcible contact with the annular lands and the annular exit groove along the entire lengths thereof and deformed into the annular grooves, said annular grooves, metal tube and annular exit groove being of relative sizes sufficient for maintaining the internal diameter of the portion of the tube within the flange at a substantially uniform value and maintaining the external diameter of the portions of the tube immediately adjacent the flange at a value less than the external diameter of the portion of tube within the flange.

12. A tube assembly, as set forth in claim 11, wherein the diameter of the annular grooves is greater than the outside diameters of the portions of the tube extending into said grooves.

13. A tube assembly, as set forth in claim 12, wherein the portions of the tube extending into the annular grooves extend into the grooves a distance of at least one-half the depth of said grooves.

14. A tube assembly, as set forth in claim 11, wherein the first end of the flange has a groove extending substantially concentrically about the central opening of the flange.

15. A tube assembly, as set forth in claim 11, wherein the flange inner walls extend inwardly toward the axis and define a shoulder and an end portion of the tube is abutting the shoulder.

16. A tube assembly, as set forth in claim 11, wherein the preselected length of the exit groove is greater than the total of the lengths of the annular grooves.

17. A tube assembly, as set forth in claim 11, wherein there are a plurality of annular lands each positioned between respective annular grooves.

18. In a tube assembly including a substantially uniform deformable metal tube and a metal fitting having a prepared joint for mechanically joining the fitting onto one end of the tube, said prepared joint comprising:

annular wall means defining an annular bore therethrough, said bore having an intermediate grooved portion therealong adapted for receiving the end of the tube and defining a plurality of longitudinally disposed alternating, annularly extending lands and locking grooves, said lands being of a substantially uniform diameter for initially axially slidably receiving said one end of the tube into the bore and said locking grooves having a predetermined substantially uniform depth sufficient to accommodate the amount of expanded metal of the tube necessary to form a secure mechanical joint therebetween after said mechanical joining wherein a predetermined length of the tube from its one end is radially expanded into tight sealing engagement against the grooved portion of the bore, said expanded length being sufficient so that a portion thereof extends a predetermined distance past the grooved portion of the bore for ensuring the substantial uniform extrusion of tube material into the locking grooves; and said annular wall means having a predetermined thickness for providing an extended end portion on the bore defining an elongated exit groove extending from an outermost land at one end of the grooved portion a distance greater than the distance that said portion of the expanded length of the tube extends for assuring that said portion of the expanded length of the tube is completely accommodated within the exit groove and is sufficiently radially expanded outwardly thereagainst so as to be supported entirely within the annular wall means and assuring a minimal amount of tube wall thinning occurring therein, said extended exit groove end portion having a substantially uniform diametral size greater than the diametral size of the unexpanded tube.

* * * * *